(12) United States Patent
Monkiewicz et al.

(10) Patent No.: US 7,026,398 B2
(45) Date of Patent: Apr. 11, 2006

(54) AIR-DRYING SILANE COATING COMPOSITIONS

(75) Inventors: Jaroslaw Monkiewicz, Rheinfelden (DE); Roland Edelmann, Wehr (DE); Andrea Edinger, Wehr (DE); Bjoern Borup, Rheinfelden (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/393,067

(22) Filed: Mar. 21, 2003

(65) Prior Publication Data

US 2003/0186066 A1   Oct. 2, 2003

(30) Foreign Application Priority Data

Mar. 21, 2002   (DE)   ................. 102 12 523

(51) Int. Cl.
*C08L 83/08*   (2006.01)
(52) U.S. Cl. .................. 525/100; 528/38; 528/42; 106/287.11; 525/476
(58) Field of Classification Search ........... 106/287.11; 528/38, 42; 525/100, 476
See application file for complete search history.

(56) References Cited

U.S. PATENT DOCUMENTS

| | | | | |
|---|---|---|---|---|
| 3,849,187 A | * | 11/1974 | Fetscher et al. ............. | 257/786 |
| 4,250,074 A | * | 2/1981 | Foscante et al. ............. | 523/428 |
| 5,314,980 A | * | 5/1994 | Morrison ..................... | 528/19 |
| 5,618,860 A | * | 4/1997 | Mowrer et al. ............. | 523/421 |
| 5,705,561 A | * | 1/1998 | Kozakiewicz et al. ...... | 524/730 |
| 6,281,321 B1 | * | 8/2001 | Kelly et al. .................. | 528/17 |
| 6,414,077 B1 | * | 7/2002 | Barron et al. ............... | 524/588 |
| 6,500,486 B1 | * | 12/2002 | Anderson et al. ........... | 427/164 |
| 6,548,614 B1 | * | 4/2003 | Mohri et al. ................ | 528/14 |
| 6,630,205 B1 | * | 10/2003 | Brueck et al. .............. | 427/387 |
| 2003/0072873 A1 | | 4/2003 | Edelmann et al. | |

FOREIGN PATENT DOCUMENTS

| | | |
|---|---|---|
| DE | 42 05 819 A | 9/1993 |
| DE | 199 61 632 A | 6/2001 |
| DE | 101 51 264 A1 | 4/2003 |
| EP | 0 274 112 | 7/1988 |
| EP | 0 518 057 A1 | 12/1992 |
| EP | 0 814 110 A1 | 12/1997 |
| EP | 0 846 716 A2 | 6/1998 |
| EP | 941 290 B1 * | 9/1999 |
| EP | 0 960 921 A2 | 12/1999 |
| EP | 1 033 395 A2 | 9/2000 |
| EP | 1 101 787 A2 | 5/2001 |
| JP | 60 238372 A | 11/1985 |

OTHER PUBLICATIONS

Hatsuo Ishida et al., "The structure of aminofunctional silane coupling agents: 1. γ-Aminopropyltriethoxysilane and its analogues", POLYMER, Feb. 1982, vol. 23, pp. 251-257.

* cited by examiner

*Primary Examiner*—Margaret G. Moore
(74) *Attorney, Agent, or Firm*—Oblon, Spivak, McClelland, Maier & Neustadt, P.C.

(57) ABSTRACT

The present invention relates to an air-drying silane coating composition containing an epoxy or acrylic resin, an optional silicic ester or alkyl silicate, an aminoalkylsilane component, an optional organoalkyoxysilane, and possible auxiliaries; methods of use thereof, and articles and substrates coated accordingly.

27 Claims, No Drawings

AIR-DRYING SILANE COATING COMPOSITIONS

FIELD OF THE INVENTION

The present invention relates to an air-drying silane coating composition containing an epoxy or acrylic resin, an optional silicic ester or alkyl silicate, an aminoalkylsilane component, an optional organoalkyoxysilane, and possible auxiliaries; methods of use thereof, and articles and substrates coated accordingly.

BACKGROUND OF THE INVENTION

Coating compositions, such as paints and varnishes, have been known for a long time. Their possible applications are diverse; one need only consider large metal structures, such as ships, railroad wagons, industrial plant, bridges, or other constructions with substantially smooth surfaces which require protection against the effect of weathering, corrosion or soiling, e.g., graffiti.

Examples of known systems include silane-based radiation-crosslinking systems and also thermosetting systems (EP-A 0 424 645, EP-A 0 408 047). The curing of such coatings requires a UV or electron beam source or an oven, of appropriate size.

Coating systems based on silicon resin are known (EP-A 0 670 870). The coating systems provided are constructed based on silicone resins and aminosilanes. Silicone resin, likewise, is often inappropriate because of cost, and cannot be used in a large number of applications, since they require many different types of resin and grades.

Two-component systems have also been described (WO 96/16109). In these systems, the silane is used both in the binder and in the curing component. However, two-component systems of this kind are inappropriate, since they are complicated and have poor storage properties. Moreover, there is no guarantee that, on site, the components will be mixed in the correct proportions.

A one-component system has been described in, for example, EP-A 0 786 499. This moisture-crosslinking composition is composed of at least one polyfunctional acrylate, at least one titanium or silicon ester, and a higher fraction of at least one amino-functional trialkoxysilane. In this system only acrylic resin can be used. This greatly restricts the flexibility of the coating to expand the possibilities for use.

Furthermore, the coatings of the above systems have adequate adhesion only on materials such as glass, wood, polycarbonate, polyethylene, polypropylene, polyethylene terephthalate, and polystyrene. The adhesion to steel and other materials, such as aluminum, is much less.

Additionally, coatings based on aminosilanes often have poor water stability and poor adhesion following water treatment. The coatings ought also to have properties such as scratch resistance and water resistance.

Therefore, there is a need in the art for compositions, which can be used as coating that provide good adhesion to a variety of substrates, with ease of use, and provide good resistance to, for example, scratches and water.

SUMMARY OF THE INVENTION

It is an object of the present invention to provide a further air-drying coating composition. A particular concern was to enhance the adhesiveness of a coating of this kind on an aluminum surface.

One object of the present invention is a water-free composition containing (a) at least one epoxy resin, at least one acrylic resin, at least one acrylic resin monomer, at least one copolymer based on an acrylic monomer, at least one copolymer based on an epoxy monomer, or a mixture thereof; and (b) at least one aminoalkylsilane, a mixture of aminoalkylsilanes, condensates therof, or cocondensates thereof, wherein the molar ratio of the amino groups of the aminoalkylsilane to the functional acrylate groups of the acrylic resin in the case of an acrylate-containing coating composition is less than 7:1, the composition can optionally contain (c) one or more of a silicic ester and at least one alkyl silicate; and/or (d) one or more of an organosilane, a mixture of organosilanes, condensates thereof, and cocondensates thereof.

It is another object of the invention to provide the aforementioned composition that also contains one or more of solvents, solubilizers, diluents, rheological assistants, inorganic microparticles or nanoparticles, matting agents, pigments, dye, wetting assistants, surfactants, dispersants, hydrolysis catalysts, condensation catalysts, defoamers, film formers, and/or UV stabilizers.

In one embodiment of the invention, (a) is at least one aromatic epoxy resin, at least one aliphatic epoxy resin, at least one acrylic resin monomer or a copolymer selected from the group consisting of aliphatic urethane acrylate, aromatic urethane acrylate, aliphatic epoxy acrylate, aromatic epoxy acrylate, and polyester acrylate.

In another embodiment of the invention (d) is of tetramethoxysilane, tetraethoxysilane, tetrapropoxysilane, an ethyl silicate having an average degree of oligomerization of from 2 to 5, a methyl silicate, a methyl polysilicate having an average degree of polymerization of from 2 to 10, and a mixed alkoxide of silicon and/or aluminum.

In another embodiment of the invention (b) is an aminoalkylsilane of the general formula I:

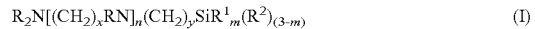

$$R_2N[(CH_2)_xRN]_n(CH_2)_ySiR^1{}_m(R^2)_{(3-m)} \qquad (I)$$

wherein

R can be identical or different and R is a hydrogen, a linear alkyl group having from 1 to 4 carbon atoms, a branched alkyl group having from 1 to 4 carbon atoms, or an aminoalkyl group of the form $R_2N(CH_2)_x$—; $R^1$ is a linear alkyl group having from 1 to 8 carbon atoms, cyclic alkyl group having from 1 to 8 carbon atoms, or branched alkyl group having from 1 to 8 carbon atoms; and $R^2$ is an alkoxy group or acetoxy group; x is an integer from 1 to 4; y is an integer from 1 to 16; n is 0 or 1 or 2 or 3; and m is 0 or 1 or 2.

In another embodiment of the invention (b) is one or aminoalkylalkoxysilane selected from the group consisting of 3-aminopropyltrimethoxysilane, 3-aminopropyltriethoxysilane, 3-aminopropylmethyldimethoxysilane, 3-aminopropylmethyldiethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-aminoethyl)-3-aminopropyltriethoxysilane, N-(2-aminoethyl)-N'-(2-aminoethyl)-3-aminopropylmethyldimethoxysilane, N-(2-aminoethyl)-N'-

(2-aminoethyl)-3-aminopropylmethyldiethoxysilane, bis(triethoxysilylpropyl)amine, bis(trimethoxysilylpropyl)amine, N-(2-aminobutyl)-3-aminopropyltriethoxysilane, N-(2-aminobutyl)-3-aminopropyltrimethoxysilane, and mixtures thereof.

In another embodiment of the invention (d) is at least one organosilane of the general formula II:

wherein $R^4$ is a hydrogen, a linear alkyl group with from 1 to 18 carbon atoms, a branched alkyl group with from 1 to 18 carbon atoms, a cyclic alkyl group with from 1 to 18 carbon atoms, a perfluoroalkyl group with from 1 to 16 carbon atoms, a fluoroalkyl group with the formula $F_3C(CF_2)_p(CH_2)_2—$, wherein p is from 0 to 14, or an alkyl group having an epoxy-functional radical; $R^5$ is a linear having from 1 to 12 carbon atoms, a cyclic having from 1 to 12 carbon atoms, or branched alkyl group having from 1 to 12 carbon atoms; $R^6$ is an alkoxy group or an aroxy group; and r is 0 or 1 or 2.

In another embodiment of the invention (d) is at least one organosilane from the group consisting of methyltrimethoxysilane, methyltriethoxysilane, n-propyltrimethoxysilane, n-propyltriethoxysilane, n-octyltrimethoxysilane, n-octyltriethoxysilane, i-octyltrimethoxysilane, i-octyltriethoxysilane, hexadecyltrimethoxysilane, hexadecyltriethoxysilane, octadecyltrimethoxysilane, octadecyltriethoxysilane, tridecafluoro-1,1,2,2-tetrahydrooctyltrimethoxysilane, tridecafluoro-1,1,2,2-tetrahydrooctyltriethoxysilane, 3-glycidyloxypropyltrimethoxysilane, 3-glycidyloxypropyltriethoxysilane, and mixtures thereof.

In another embodiment of the invention, the composition contains a condensate or cocondensate of at least one of aminoalkylalkoxysilane, and organoalkyoxysilane.

In another embodiment of the invention, the composition contains a condensate or cocondensate a silicic ester.

In another embodiment of the invention the composition also contains (e) at least one of a corundum having an average particle size of from 2 to 40 μm and a pyrogenic silica having an average particle size of from 2 to 200 nm.

In another embodiment of the invention, the composition contains microscale or nanoscale particles, which may be enveloped by one or more of aminoalkyl-functional silanes, aminoalkyl-functional siloxanes, alkenyl-functional silanes, alkenyl-funcational siloxanes, epoxyalkyl-functional silanes, epoxyalkyl-functional siloxanes, methacryloyloxyalkyl-functional silanes, methacryloyloxyalkyl-functional siloxanes, hydroxy-functional silanes, hydroxy-functional siloxanes, alkoxy-functional silanes, alkoxy-functional siloxanes, acryloyl-functional silanes, acryloxyl-functional siloxanes, alkyl-functional silanes, alkyl-functional siloxanes, fluoroalkyl-functional silanes, and fluoroalkyl-functional siloxanes.

In another embodiment of the invention the composition has a viscosity of less than 3 500 mPa.s.

The invention also provides methods of coating a substrate with the compositions described herein; and substrates coated thereby.

DETAILED DESCRIPTION OF THE INVENTION

All publications, patent applications, patents, and other references mentioned herein are incorporated by reference in their entirety. In addition, the materials, methods, and examples are illustrative only and are not intended to be limiting.

The terms acrylic resin and acrylate resin are used synonymously. Additionally, the terms acrylic monomer and acrylic resin monomer are used synonymously. Moreover, references below to acrylate should be understood to include both acrylic resin and acrylic monomer.

It has surprisingly been found that a water-free formulation containing (i) at least one epoxy resin, at least one acrylic resin, at least one acrylic resin monomer, at least one copolymer based on an acrylic monomer or epoxy monomer, such as an epoxy acrylate, urethane acrylate or polyester acrylate, to mention but a few, or a mixture of the aforementioned components, (ii) if desired, at least one silicic ester and/or alkyl silicate, (iii) at least one aminoalkylsilane, a mixture of aminoalkylsilanes or condensates or cocondensates thereof, and (iv) if desired, an organosilane, a mixture of organosilanes or corresponding condensates or cocondensates, the molar ratio of the amino groups of the aminoalkylsilanes to the functional acrylate groups of the acrylate resin in the case of an acrylate-containing coating composition being less than 7:1, preferably 6.5:0.1, with particular preference 6:0.3, with very particular preference 5:0.5, and in particular 4:0.8, is obtainable simply and economically, possesses good storage properties, is easy to apply as a low-viscosity and air-drying coating composition to a substrate, and, as a cured coating, achieves outstanding adhesion to the substrate, especially to aluminum surfaces. Accordingly, it is possible in an advantageous way to provide a further air-drying one-component system, with all of its advantages, as a coating composition.

In the context of the present invention, "air-drying" means that the present formulation, following application to a substrate, cures in the presence of air, the air having a relative humidity of preferably from 10 to 100%, with particular preference from 15 to 95%, with very particular preference from 20 to 90%, in particular from 25 to 80%, and a temperature in the range from −10 to 120° C., with particular preference from 5 to 80° C., with very particular preference from 10 to 60° C., in particular from room temperature to 40° C.

Coatings of the invention possess good adhesion properties throughout and generally cure within from 1 to 7 days, the coating already being dust-dry appropriately after from 0.1 to 6 hours, preferably after from 0.2 to 4 hours, and with particular preference after from 0.3 to 2 hours. The curing process can, however, also be further accelerated markedly by means of a "sauna treatment" at high temperature, preferably from 50 to 100° C., and high humidity, preferably from 60 to 95% relative humidity.

A formulation of the invention contains appropriately from 2.5 to 50% by weight, preferably 3.5 to 40% by weight, with particular preference from 5 to 25% by weight, of component (i), from 0 to 60% by weight, preferably 0.5 to 50% by weight, with particular preference from 5 to 40% by weight, of component (ii), from 15 to 90% by weight, preferably 20 to 80% by weight, with particular preference from 30 to 70% by weight, of component (iii), from 0 to 60% by weight, preferably 0.5 to 50% by weight, with particular preference from 5 to 40% by weight, of component (iv), and from 0 to 50% by weight, preferably 0 to 40% by weight, with particular preference from 0 to 30% by weight, of one or more components (v) as further additions, the fractions of the components present in the composition of the invention totaling not more than 100% by weight.

With preference component (i) is composed of at least one epoxy resin or acrylic resin or acrylic resin monomer. Likewise suitable are copolymers, such as polyester acrylates, urethane acrylates, and epoxy acrylates, for example. A formulation of the invention preferably comprises as component (i) at least one aromatic epoxy resin, such as ARALDIT® GY 260, or an aliphatic epoxy resin, such as Uvacure® 1500, or an acrylic resin monomer, such as Sartomer® 494 (an epoxidized pentaerythritol tetraacrylate) or Sartomer® 454 (an epoxidized trimethylolpropane triacrylate) or a copolymer from the aliphatic urethane acrylate series, e.g., Ebecryl® 8210 or Ebecryle® 8402, or an epoxy acrylate, such as Sartomer® CN 104, CN 981 or CN 934 (aliphatic urethane diacrylates), CN 976 (aromatic urethane acrylates), or a monofunctional acrylate, such as oxyethylated phenol acrylate, n-butyl acrylolyoxo/oxyethyl carbonate, octyl and/or decyl acrylate mixtures, isobornyl acrylate, or a difunctional acrylate, such as dipropylene glycol diacrylate, polyethylene glycol diacrylate, diacryloyl-functional bisphenol A derivative, hexanediol diacrylate, tripropylene glycol diacrylate, or a trifunctional acrylate, such as polyether acrylate, ethoxylated trimethylolpropane triacrylate, acrylated trifunctional resins, or an oligomeric triacrylate/glycerol derivative, trimethylolpropane triacrylate, or a tetrafunctional or hexafunctional product, such as dipentaerythritol hexaacrylate, polyether tetracrylate, ditrimethylolpropane tetraacrylate, mixtures of pentaerythritol triacrylates and tetraacrylates, or a polyester acrylate, such as amine-modified polyether acrylates, hexafunctional polyester acrylates, tetrafunctional polyester acrylates, or a dilute polyester resin, such as chlorinated polyester resins, or an epoxy acrylate, such as bisphenol A epoxy acrylates, epoxidized soybean oil acrylates, amino-functional bisphenol A epoxy acrylates, fatty-acid-modified epoxy acrylates, or a diacrylated compound, such as epoxy diacrylates, aromatic difunctional urethane acrylates, aliphatic difunctional urethane acrylates, dissolved or water-soluble aromatic or aliphatic urethane acrylates, or a triacrylated compound, such as aliphatic or aromatic trifunctional urethane acrylates, or a hexaacrylated product, such as aromatic or aliphatic hexafunctional urethane acrylates, or, for example, an Ebecryl® product from UCB, or a resin for coatings—as in the book "Lackharze Chemie, Eigenschaften und Anwendungen", D. Stoye, W. Freitag, Carl Hanser Verlag (1996), especially epoxy compounds, epoxy resins and commercial products from pages 247 to 251.

Coating compositions of the invention may further comprise as component (ii), preferably, tetramethoxysilane, tetraethoxysilane, tetrapropoxy-silane, such as DYNASIL®, M, A, P, or ethyl silicate having an average degree of oligomerization from 2 to 5, such as DYNASIL® 40, or a methyl silicate or a methyl polysilicate having an average degree of polymerization from 2 to 10, such as Methyl Silicate 56 from Tama Chemicals Co. Ltd., or a mixed alkoxide of corresponding silicon and aluminum compounds, such as DYNASIL® SI-Al, aluminum alkoxides, such as aluminum triisopropoxides and aluminum tributylate, or alkoxides of other metals, such as of titanium or zirconium, such as ethyl titanate, n-propyl titanate, isopropyl titanate, n-butyl titanate, n-butyl zirconate, to give but a few examples. Such products are available commercially, for example, under the brand names DOROX® (Sasol) or TYZOR® (DuPont).

Additionally, a formulation of the invention comprises as component (iii), preferably, at least one aminoalkylsilane of the general formula I $$R_2N[(CH_2)_xRN]_n(CH_2)_ySiR^1_m(R^2)_{(3-m)} \qquad (I)$$

in which the groups R are identical or different and R is a hydrogen or a linear or branched alkyl group having from 1 to 4 carbon atoms or an aminoalkyl group of the form $R_2N(CH_2)_x-$, $R^1$ is a linear, cyclic or branched alkyl group having from 1 to 8 carbon atoms and $R^2$ is an alkoxy group or acetoxy group, x is an integer from 1 to 4, y is an integer from 1 to 16, and n is 0 or 1 or 2 or 3 and m is 0 or 1 or 2.

With particular preference, use is made as component (iii) in a formulation of the invention of at least one aminoalkylalkoxysilane from the group consisting of 3-aminopropyltrimethoxysilane (AMMO), 3-aminopropyltriethoxysilane (AMEO), 3-aminopropylmethyldimethoxysilane, 3-aminopropylmethyldiethoxysilane, N-(2aminoethyl)-3-aminopropyltrimethoxysilane (DAMO), N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2aminoethyl)-3-aminopropyltriethoxysilane, N-(2-aminoethyl)-N'-(2-aminoethyl)-3-aminopropylmethyldimethoxysilane, N-2(2-aminoethyl)-N'-(2-aminoethyl)-3-aminopropylmethyldiethoxysilane, bis (triethoxysilylpropyl) amine, bis(trimethoxysilylpropyl) amine, N-(2-aminobutyl)-3-aminopropyltriethoxysilane, N-(2-aminobutyl)-3-aminopropyltrimethoxysilane or mixtures thereof or corresponding products which carry a different alkyl group instead of the respective propyl group.

Also suitable as component (iii) are condensates or cocondensates of aforementioned aminosilanes. The condensates or cocondensates may also be used in the form of partial hydrolysates, examples being DYNASYLAN® 1146 and 1148. Such condensates or cocondensates are preferably employed in highly concentrated form or as alcoholic solutions. For example, in the case of a condensate containing ethoxy groups, a solution containing ethanol is appropriately employed. In order to improve the coating properties, e.g., adhesion, drying time, etc., however, it is also possible to use other organic solvents, examples being glycol, such as butyl glycol, alcohols, such as methanol, isopropanol and butanol, acetates, such as butyl acetate, and ketones, such as methyl ethyl ketone, to name but a few.

It is also possible to use cocondensates obtainable from an aminosilane, cf. formula I, and at least one other organic silane, examples being those of formula II, and/or a tetraalkoxysilane. Such condensates or cocondensates can be found, for example, in the German patent application 101 51 264.3.

Furthermore, formulations of the invention preferably comprise component (iv) at least one organosilane of the general formula II $$R^4SiR^5_r(R^6)_{(3-r)} \qquad (II)$$

in which $R^4$ is a hydrogen or a linear, branched or cyclic alkyl group with from 1 to 18 carbon atoms or a perfluoroalkyl group with from 1 to 16-carbon atoms or a fluoroalkyl group with the form $F_3C(CF_2)_p(CH_2)_2-$ where p is from 0 to 14 or an alkyl group having an epoxy-functional radical, such as in DYNASYLAN® GLYMO, a 3-glycidyloxypropyltrimethoxysilane, for example, $R^5$ is a linear, cyclic or branched alkyl group having from 1 to 12 carbon atoms, and $R^6$ is an alkoxy group or a corresponding aromatic group, such as a phenoxy group or a fused-on bisphenol A, and r is 0 or 1 or 2. In particular, coating compositions of this kind which are air-drying in accordance with the invention may comprise as component (iv) at least one organosilane from the group consisting of methyltrimethoxysilane, methyltriethoxysilane (MTES), n-propyltrimethoxysilane (PTMO), n-propyltriethoxysilane (PTEO), n-octyltrimethoxysilane, n-octyltriethoxysilane (OCTEO), i-octyltrimethoxysilane, i-octyltriethoxysilane, hexadecyltrimethoxysilane, hexadecyltriethoxysilane, octadecyltrimethoxysilane, octadecyltriethoxysilane, tridecafluoro-1,1,2,2-tetrahydrooctyltrimethoxysilane, tridecafluoro-1,1,2,2-tetrahydrooctyltriethoxysilane, 3-glycidyloxypropyltrimethoxysilane (GLYMO), 3-glycidyloxypropyltriethoxysilane (GLYEO) or mixtures thereof.

With particular preference present formulations comprise components (iii) or (iv) condensates or cocondensates of at least one aminoalkyloxysilane, at least one organoalkoxysilane, and, if desired, a silicic ester. Very particularly suitable cocondensates are those obtainable from at least one aminoalkylalkoxysilane and one fluoroalkylalkoxysilane, examples being active substances such as are present in DYNASYLAN® F 8800, F 8810 or F 8815; cf. EP 0 846 716 B1, EP 0 960 921 A2, EP 1 101 787 A2.

The fraction of Si-bonded fluoroalkyl functions in formulations of the invention is suitably from 0.001 to 5% by weight, based on the coating composition.

A formulation of the invention may be in particular contain from 0.05 to 3% by weight of fluoroalkylalkoxysilane, such as DYNASYLAN® F 8161 and F 8261, or an oligomeric cocondensate, such as DYNASYLAN® 8800, based on the coating composition, or alcoholic solutions of the fluoroalkylalkoxysilanes, e.g., DYNASYLAN® F 8262 and F 8263; c.f. EP 1 033 395 A2.

It is, however, also possible to use condensates obtainable from an organoalkoxysilane as component (iv), c.f. EP 0 814 110 B1. It is further possible to use cocondensates, such as are disclosed in EP 0 518 057 B1, for example.

Formulations of the invention may comprise as a further component (v) at least one component from the group consisting of solvents, preferably from 0 to 30% by weight, such as glycols, glycerol or β-diketonates, acetylacetonates, ketones, alcohols, acetates, solubilizers, diluents, rheological assistants, inorganic microparticles or nanoparticles, preferably from 0 to 30% by weight, such as pyrogenic silica, e.g., Aerosil, boehmite, corundum, aluminas, precipitated silica, matting agents, pigments, such as $TiO_2$ or carbon black, preferably from 0 to 5% by weight, dye, wetting assistants, dispersants, film formers, examples being surfactants, Disperbyk® (Byk Chemie), TEGO® Dispers 610 S, TEGO®WET 270 (cf. also www.TEGO.de), hydrolysis catalysts or condensation catalysts, preferably from 0 to 2% by weight, such as $NH_4F$, NaF, organic and inorganic acids, e.g. formic acid, acetic acid or HCl, organotin compounds, aluminum sec-butylate, titanium and zirconium ethoxides or propoxides, titanium, aluminum, and zirconium acetonates, defoamers, such as silicones, including Foamex® (Tego Chemie), UV stabilizers, preferably from 0 to 3% by weight, such as 2-hydroxybenzophenons or hydroxyphenyltriazines, for example.

A coating composition of the invention suitably contains in total from 0 to 50% by weight, preferably from 0.1 to 40% by weight, with particular preference to 0.5 to 30% by weight, of components (v), based on the coating composition.

Thus a formulation of the invention may comprise as solvents or diluents, in particular, methanol, ethanol, isopropanol or n-butanol. As solubilizers, too, alcohols or other polar solvents, for example, are suitable.

In order to adjust the rheological properties of formulations of the invention it is possible, for example, to use precipitated and pyrogenic silica. Thus, for example, by adding a finely divided silica of high surface area, such as Aerosil 200, or other rheological assistants to a coating composition of the invention it is possible to raise or tailor the viscosity. Pigments as well, such as titanium dioxide, precipitated or pyrogenic silica, talc, mica, or dyes, such as ultra marine blue, can be added as a coloring component (v).

Furthermore, in order to improve further the abrasion and scratch resistance properties of coatings of the invention, the air-drying coating composition of the invention may comprise, as one of components (v), fused corundum or else sintered corundum having an average particle size of from 2 to 40 μm, preferably from 5 to 20 μm, and/or pyrogenic silica having an average particle size of from 2 to 200 nm, preferably from 5 to 50 nm, examples being Aerosil® OX-50, Aerosil® 200, it being possible for the microscale or nanoscale particles to be enveloped by aminoalkyl-, alkenyl-, epoxyalkyl-, methacryloyloxyalkyl-, hydroxy-, alkoxyl-, acryloyl-, alkyl- and/or fluoroalkyl-functional silanes or siloxanes, as disclosed in particular by the German patent applications 101 00 631, 101 00 633, 101 41 688 and 101 41 690.

The fraction of nanoscale and/or microscale particles in compositions of the invention, particularly for abrasion resistance or scratch resistance applications, is suitably from 0.01 to 30% by weight, preferably from 0.5 to 15% by weight, with particular preference from 5 to 10% by weight, based on the coating composition.

In particular a hydrolysis catalyst or condensation catalyst may be added to a coating composition of the invention.

As the catalyst system, accordingly, it is possible, for example, to use dibutyltin laurate (DBTL), ammonium fluoride, sodium fluoride, organic and inorganic acids, such as acrylic acid, formic acid, acetic acid, aluminum alkoxides, titanium alkoxides, zirconium alkoxides, and also chelates of the elements aluminum, titanium, and zirconium.

Formulations of the invention are in general of low viscosity and preferably have a viscosity [measured by the Ubbelohde method T=20° C.] of less than 3 500 mPa.s, preferably from 1 to 3 000 mPa.s, with particular preference from 50 to 2 500 mPa.s, with very particular preference from 100 to 2 000 mPa.s, in particular from 250 to 1 000 mPa.s.

In general a composition of the invention is prepared by introducing components (i), (ii), (iv), and (v), where used, as an initial charge and then adding component (iii), generally with thorough mixing. The nanoparticles and microparticles can be incorporated by dispersion afterward.

It is, however, also possible to incorporate the nanoparticles and microparticles into component (i) by dispersion and then to proceed as described above.

Another variant involves adding component (iii) to component (i) and then adding components (ii), (iv) and (v).

The components are generally mixed by simple stirring. Solids, nanoparticles and/or varnish systems containing microparticles, or corresponding pastes, should be incorporated by dispersion into the mixture. Dispersing takes place, for example, by means of a dissolver, but is also possible with a bead mill or other dispersion apparatus, e.g., by means of Torrusmill®.

A coating composition of the invention may be applied to a substrate, for example, by brushing, spraying, knife coating, dipping or rolling. The viscosity of the coating material of the invention must be adapted to the individual application forms. For example, the viscosity for roller application should be more than 100 mPa.s. This can be achieved, where appropriate, by adding rheological assistants. Accordingly, the present invention further provides for the use of a formulation of the invention for producing a coating on a substrate.

Examples of substrates which can be coated advantageously in accordance with the invention include glass, wood, plastic, such as PVC, polycarbonate, polyurethane, polymethacrylate (Plexiglas®) or poly-styrene, for example, metal, especially aluminum, metal alloys, steel, stone, artificial stone, ceramic or concrete.

The present invention additionally provides coatings obtainable using a formulation of the invention.

The invention likewise provides articles having such a coating of the invention.

Coatings of the invention based on an application of coating compositions of the invention, the formulations of the invention comprising fluoroalkyl functional silanes or siloxanes, are preferentially also distinguished by water, oil, ink, paint, varnish, dirt, and dust repellency properties. Such systems can therefore be used with advantage for anti-graffiti applications and also for the corrosion protection of metal surfaces.

Having generally described this invention, a further understanding can be obtained by reference to certain specific examples which are provided herein for purposes of illustration only, and are not intended to be limiting unless otherwise specified.

EXAMPLES

| Ingredients: | |
|---|---|
| Sartomer ® 494: | tetrafunctional acrylate |
| ARALDIT ® GY 260: | epoxy resin based on bisphenol A |
| Ebecryl ® 220: | hexafunctional aromatic urethane acrylate, MW = 1000 g/mol |
| Uvacure ® 1500: | cycloaliphatic epoxy resin, epoxy equivalent: 134 g/epoxide group |
| DYNASIL ® A: | tetraethoxysilane |
| DYNASYLAN ® AMEO: | 3-aminopropyltriethoxysilane |
| DYNASYLAN ® DAMO: | N-aminoethyl-3-aminopropyltrimethoxysilane |
| DYNASYLAN ® 8261: | tridecafluoro-1,1,2,2-tetrahydrooctyltriethoxysilane |
| DYNASYLAN ® 8800: | aminoalkyl-/fluoroalkyl-functional siloxane |

Note:
All coating materials listed below as examples are stable on storage at 50° C. for at least 8 months.

Example 1

Air-Drying Coating Material on Epoxy Resin Basis

ARALDIT® GY 260 (25.0 g), ethanol (25.0 g) and DYNASIL® A (50 g) were introduced at room temperature. A colorless, clear solution formed over the still-undissolved ARALDIT® GY 260. The solution was stirred at room temperature for about 30 minutes until the ARALDIT® GY 260 had dissolved. Then DYANSYLAN® AMEO (112.5 g) was added rapidly (about 125 ml in 6 minutes) through a dropping funnel. The solution remained clear and colorless and the temperature rose by about 6° C. It was then stirred at room temperature for 2 hours more.

The resulting product was clear and of low viscosity (6.9 mPa.s, DIN 53 015, 20° C.).

Example 1a

The coating material was prepared as specified in example 1 except that the amount of resin is doubled to 50 g. The other quantities remained the same.

The coating material was knife coated onto metal test panels (aluminum) using a doctor blade. The wet film thickness was 12 μm. The coating was dust-dry after 45 minutes at 22° C. and 45% relative humidity. A smooth, colorless, clear coat formed on the surface. The coat had a pencil hardness (ISO 15184 scratch hardness) after 7 days of 3H. The cross-hatch (according to DIN 53 151) was Gt0. The dry film thickness after 48 hours was 3.3 μm.

The coat was tested for water resistance by being stored in water for 2 days. Thereafter the cross-hatch was still Gt0. An intensified cross-hatch with adhesive tape tearoff was also assessed as being Gt0.

Example 1b

The preparation of the coating material was as set out in example 1 except that ARALDIT® was replaced by Uvacure® 1500. The other ingredients remained the same. All quantities remained the same.

The coating material was knife coated onto metal test panels (aluminum) using a doctor blade. The test panels had been treated with ethyl acetate beforehand. The wet film thickness was 12 μm. The coating was dust-dry after 60 minutes at 22° C. and 35% relative humidity. A smooth, colorless, clear coat formed on the surface. The coat had a pencil hardness (ISO 15184 scratch hardness) after 7 days of 4H. The cross-hatch (according to DIN 53 151) was Gt0. An intensified cross-hatch with adhesive tape tearoff was also assessed as being Gt0. The dry film thickness after 48 hours was 3.3 μm.

The coat was tested for water resistance by being stored in water for 2 days. Thereafter the cross-hatch was still Gt0. An intensified cross-hatch with adhesive tape tearoff was also assessed as being Gt0.

Example 2

Air-Drying Coating Material on Acrylate Resin Basis

Ebecryl® 220 (25.0 g), ethanol (25.0 g) and DYANSIL® A (50 g) were introduced at room temperature. A cloudy white liquid was formed. The solution was stirred at room temperature for about 30 minutes. Then DYNASYLAN® AMEO (112.5 g) was added rapidly (about 125 ml in 8 minutes) through a dropping funnel. During the addition the liquid was clear and pale salmon in color, and the temperature rose by about 23° C. It was then stirred at room temperature for 2 hours more. The solution became darker to pink-colored.

The ratio of $NH_2$ groups to acrylic groups was 3.4:1.

A clear pale pink-colored product of low viscosity (8.7 mpa.s) was formed.

Example 2a

A Further Example Based on Acrylic Resin

Sartomer® 494 (4.8 g), ethanol (42.1 g) 0.2 g of acrylic acid, 0.2 g of water and DYANSIL® A (9.6 g) were introduced at room temperature. A slightly cloudy liquid formed. The solution was stirred at room temperature for about 30 minutes. Then DYNASYLAN® DAMO (43.1 g) was added rapidly through a dropping funnel. The temperature rose by about 21° C. The mixture was then stirred at room temperature for 2 hours more.

The ratio of $NH_2$ groups to acrylic groups was 5.4:1.

Example 3

Air-Drying Coating Material Based on Acrylic Resin and Fluorosilane.

Ebecryl® 220 (25.0 g), ethanol (25.0 g), DYNASYLAN® F 8261 (6.38 g) and DYANSIL® A (50 g) were introduced at room temperature. A cloudy white liquid was formed. The solution was stirred at room temperature for about 30 minutes. Then DYNASYLAN® AMEO (112.5 g) was added rapidly (about 125 ml in 8 minutes) through a dropping funnel. During the addition the liquid was clear and pale salmon in color, and the temperature rose by about 23° C. It was then stirred at room temperature for 2 hours more. The solution became darker to pink-colored.

Example 3a

Preparation was as in example 3 but replacing DYNASYLAN® F 8261 by DYNASYLAN® F 8800.

The coating material had a viscosity (DIN 53 015/20° C.) of 6.9 mpa.s and a solids content of 45.9% (DIN EN ISO 3251).

The coating material thus prepared was applied to aluminum panels and gave a clear smooth surface. The coating material was dust-dried off for 45 minutes and after 7 days had an hardness (ISO 15184 scratch hardness) of 6H.

In order to examine the antigraffiti effect, a number of inks were applied to the cured coating material. The soiling was relatively easy to remove. The results are summarized in the table.

TABLE

| Ink | Adhesive tape test | Removes contamination |
|---|---|---|
| Acrylic varnish dupli-color RAL 3000 | Removes paint completely | Krautol universal stripper |
| Hagebau fuchsia pink spray paint | Removes paint completely | Krautol universal stripper |
| Aqua colored spray paint toom blue | Removes paint completely | Krautol universal stripper |
| Molotow bitumen ink | Irremovable | Krautol universal stripper |
| Edding 800 | Irremovable | Ethanol |
| On the run marker | Irremovable | Ethanol |
| SNCF special ink | Irremovable | Ethanol |

The adhesive tape tearoff test involved a strip of Tesa adhesive tape being adhered to the ink and then peeled off again. If the strip of adhesive tape brought with it the entire ink, the test was passed. It was found, therefore, that a whole range of inks have no adhesion to this inventive coating material and could be removed again using the adhesive tape.

The present application claims priority to German Application DE 10212523.6, filed Mar. 21, 2002, the contents of which are incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A one-component water-free composition in package form comprising a mixture of
   (a) at least one epoxy resin, at least one acrylic resin, at least one acrylic resin monomer, at least one copolymer based on an acrylic monomer, at least one copolymer based on an epoxy monomer, or a mixture thereof;
   (b) at least one aminoalkylsilane and at least one fluoroalkylalkoxysilane, condensates thereof, or cocondensates thereof, wherein the molar ratio of the amino groups of the aminoalkylsilane to the functional acrylate groups of the acrylic resin in the case of an acrylate-containing coating composition is less than 7:1;
   (c) optionally at least one of a silicic ester and an alkyl silicate; and
   (d) optionally at least one organosilane, a mixture of organosilanes, condensates thereof, or cocondensates thereof,
   wherein the fraction of Si-bonded fluoroalkyl functions is from 0.001 to 5% by weight, based on the composition.

2. The water-free composition according to claim 1, wherein (c) is present.

3. The water-free composition according to claim 1, wherein (d) is present.

4. The water-free composition according to claim 1, which comprises from 2.5 to 50% by weight of (a), from 15 to 90% by weight of component (b), from 0 to 60% by weight of (c), and from 0 to 60% by weight of (d).

5. The water-free composition according to claim 1, which comprises from 3.5 to 40% by weight of (a), from 20 to 80% by weight of component (b), from 0.5 to 50% by weight of (c), and from 0.5 to 50% by weight of (d).

6. The water-free composition according to claim 1, which comprises from 5 to 25% by weight of (a), from 30 to 70% by weight of component (b), from 5 to 40% by weight of (c), and from 5 to 40% by weight of (d).

7. The water-free composition according to claim 1, further comprising 0 to 50% by weight of (e) one or more components selected from the group consisting of solvents, solubilizers, diluents, rheological assistants, inorganic microparticles or nanoparticles, matting agents, pigments, dye, wetting assistants, surfactants, dispersants, hydrolysis catalysts, condensation catalysts, defoamers, film formers, and UV stabilizers.

8. The water-free composition according to claim 7, wherein the one or more components is in an amount of from 0.5 to 30% by weight.

9. The water-free composition according to claim 1, wherein (a) is at least one aromatic epoxy resin, or at least one aliphatic epoxy resin, or at least one acrylic resin monomer or a copolymer selected from the group consisting of aliphatic urethane acrylate, aromatic urethane acrylate, aliphatic epoxy acrylate, aromatic epoxy acrylate, and polyester acrylate, or a mixture of any of the above.

10. The formulation according to claim 2, wherein (c) is selected from the group consisting of tetramethoxysilane, tetraethoxysilane, tetrapropoxysilane, an ethyl silicate having an average degree of oligomerization of from 2 to 5, a methyl silicate, a methyl polysilicate having an average degree of polymerization of from 2 to 10, and a mixed alkoxide of silicon and aluminum.

11. The water-free composition according to claim 1, wherein the aminoalkylsilane of (b) is an aminoalkylsilane of the general formula I:

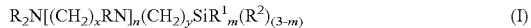

wherein

R can be identical or different and R is a hydrogen, a linear alkyl group having from 1 to 4 carbon atoms, a branched alkyl group having from 1 to 4 carbon atoms, or an aminoalkyl group of the form $R_2N(CH_2)_x$—;

$R^1$ is a linear alkyl group having from 1 to 8 carbon atoms, cyclic alkyl group having from 1 to 8 carbon atoms, or branched alkyl group having from 1 to 8 carbon atoms; and $R^2$ is an alkoxy group or acetoxy group;

x is an integer from 1 to 4;

y is an integer from 1 to 16;

n is 0 or 1 or 2 or 3; and m is 0 or 1 or 2.

12. The water-free composition as claimed in claim 11, wherein the aminoalkylsilane of (b) is an aminoalkylalkoxysilane selected from the group consisting of 3-aminopropyltrimethoxysilane, 3-aminopropyltriethoxysilane, 3-aminopropylmethyldimethoxysilane, 3-aminopropylmethyldiethoxysilane, N-(2aminoethyl)-3-aminopropyltrimethoxysilane, N-(2-aminoethyl)-3-aminopropyltriethoxysilane, N-(2-aminoethyl)-3-aminopropylmethyldimethoxysilane, N-(2-aminoethyl)-3-aminopropylmethyldiethoxysilane, N,N-di(2-aminoethyl)-3-aminopropyltrimethoxysilane, N,N-di(2-aminoethyl)-3-aminopropyltriethoxysilane, N,N-di(2-aminoethyl)-3-aminopropylmethyldimethoxysilane, N,N-di(2-aminoethyl)-3-aminopropylmethyldiethoxysilane, N-(2-aminoethyl)-N'-(2-aminoethyl)-3-aminopropyltrimethoxysilane, N-(2-aminoethyl)-N'-(2-aminoethyl)-3-aminopropyltriethoxysilane, N-(2-aminoethyl)-N'-(2-aminoethyl)-3-aminopropylmethyldimethoxysilane, N-(2-aminoethyl)-N'-(2-aminoethyl)-3-aminopropylmethyldiethoxysilane, bis (triethoxysilylpropyl) amine, bis(trimethoxysilylpropyl) amine, N-(2-aminobutyl)-3-aminopropyltriethoxysilane, N-(2-aminobutyl)-3-aminopropyltrimethoxysilane, and mixtures thereof.

13. The water-free composition according to claim 3, wherein (d) is at least one organosilane of the general formula II:

wherein $R^4$ is a hydrogen, a linear alkyl group with from 1 to 18 carbon atoms, a branched alkyl group with from 1 to 18 carbon atoms, a cyclic alkyl group with from 1 to 18 carbon atoms, a perfluoroalkyl group with from 1 to 16 carbon atoms, a fluoroalkyl group with the formula $F_3C(CF_2)_p(CH_2)_2$—, wherein p is from 0 to 14, or an alkyl group having an epoxy-functional radical;

$R^5$ is a linear having from 1 to 12 carbon atoms, a cyclic having from 1 to 12 carbon atoms, or branched alkyl group having from 1 to 12 carbon atoms;

$R^6$ is an alkoxy group or an aroxy group; and r is 0 or 1 or 2.

14. The water-free composition according to claim 13, wherein (d) is an organosilane selected from the group consisting of methyltrimethoxysilane, methyltriethoxysilane, n-propyltrimethoxysilane, n-propyltriethoxysilane, n-octyltrimethoxysilane, n-octyltriethoxysilane, i-octyltrimethoxysilane, i-octyltriethoxysilane, hexadecyltrimethoxysilane, hexadecyltriethoxysilane, octadecyltrimethoxysilane, octadecyltriethoxysilane, tridecafluoro-1,1,2,2-tetrahydrooctyltrimethoxysilane, tridecafluoro-1,1,2,2-tetrahydrooctyltriethoxysilane, 3-glycidyloxypropyltrimethoxysilane, 3-glycidyloxypropyltriethoxysilane, and mixtures thereof.

15. The water-free composition according to claim 1, comprising a condensate or cocondensate of at least one aminoalkylalkoxysilane and at least one organoalkyoxysilane.

16. The water-free composition according to claim 15, wherein a cocondensate is present and is a cocondensate of at least one aminoalkylalkoxysilane and one fluoroalkylalkoxysilane.

17. The water-free composition according to claim 3, which further comprises a condensate or cocondensate of a silicic ester.

18. The water-free composition according to claim 1, further comprising 0.05 to 30% by weight of (e) at least one of (i) a corundum as microscale particles having an average particle size of from 2 to 40 μm and (ii) a pyrogenic silica as nanoscale particles having an average particle size of from 2 to 200 nm.

19. The water-free composition according to claim 18, wherein the microscale or nanoscale particles are enveloped by one or more of aminoalkyl-functional silanes, aminoalkyl-functional siloxanes, alkenyl-functional silanes, alkenyl-functional siloxanes, epoxyalkyl-functional silanes, epoxyalkyl-functional siloxanes, methacryloyloxyalkyl-functional silanes, methacryloyloxyalkyl-functional siloxanes, hydroxy-functional silanes, hydroxy-functional siloxanes, alkoxy-functional silanes, alkoxy-functional siloxanes, acryloyl-functional silanes, acryloxyl-functional siloxanes, alkyl-functional silanes, alkyl-functional siloxanes, fluoroalkyl-functional silanes, and fluoroalkyl-functional siloxanes.

20. The water-free composition as claimed in claim 19, wherein the nanoscale or microscale particles are in an amount of from 5 to 10% by weight, based on the coating composition.

21. The water-free composition as claimed in claim 1, wherein the coating composition has a viscosity at 20° C. of less than 3,500 mPa.s.

22. A method of coating a substrate, comprising coating the substrate with the water-free composition according to claim 1.

23. The method according to claim 23, wherein the substrate is selected from the group consisting of glass, wood, plastic, metal, metal alloys, stone, artificial stone, ceramic, and concrete.

24. An article coated with the water-free composition according to claim 1, wherein said article is not plastic.

25. A water-free composition in package form comprising a mixture of (a) at least one aromatic epoxy resin, at least one acrylic resin, at least one acrylic resin monomer, at least one copolymer based on an acrylic monomer, at least one copolymer based on an epoxy monomer, or a mixture thereof; and (b) at least one aminoalkylsilane and at least one fluoroalkylalkoxysilane, condensates thereof, or cocondensates thereof, wherein the molar ratio of the amino groups of the aminoalkylsilane to the functional acrylate groups of the acrylic resin in the case of an acrylate-containing coating composition is less than 7:1, wherein the fraction of Si-bonded fluoroalkyl functions is from 0.001 to 5% by weight, based on the coating composition.

26. A water-free composition in package form comprising a mixture of
   (a) at least one epoxy resin, at least one acrylic resin, at least one acrylic resin monomer, at least one copolymer based on an acrylic monomer, at least one copolymer based on an epoxy monomer, or a mixture thereof; and
   (b) at least one aminoalkylsilane and at least one fluoroalkylalkoxysilane, condensates thereof, or cocondensates thereof, wherein the molar ratio of the amino groups of the aminoalkylsilane to the functional acrylate groups of the acrylic resin in the case of an acrylate-containing coating composition is less than 7:1, wherein said water-free composition is stable on storage at 50° C. for at least eight months, wherein the fraction of Si-bonded fluoroalkyl functions is from 0.001 to 5% by weight, based on the coating composition.

27. The water-free composition as claimed in claim 21, wherein the viscosity at 20° C. is from 250 to 1,000 mPa.s.

* * * * *